: US 10,828,733 B2

United States Patent
Hollingsworth et al.

(10) Patent No.: US 10,828,733 B2
(45) Date of Patent: *Nov. 10, 2020

(54) METHOD FOR REPURPOSING A SHIPPING CONTAINER INTO A REFRIGERATED COLD BOX

(71) Applicant: Aldelano IP Holdings, LLC, Ontario, CA (US)

(72) Inventors: Alfred Hollingsworth, Ontario, CA (US); Nicole Smith, Grand Rapids, MI (US); Michael Goodwyn, Jackson, TN (US); Nicholos Rakestraw, Jackson, TN (US)

(73) Assignee: Aldelano IP Assets, Inc., Grand Rapids, MI (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/148,729

(22) Filed: Oct. 1, 2018

(65) Prior Publication Data

US 2019/0030661 A1 Jan. 31, 2019

Related U.S. Application Data

(63) Continuation of application No. PCT/US2017/025716, filed on Apr. 3, 2017.

(60) Provisional application No. 62/317,176, filed on Apr. 1, 2016.

(51) Int. Cl.
| F25D 11/00 | (2006.01) |
| B65D 90/06 | (2006.01) |
| F25D 23/06 | (2006.01) |
| B23P 15/26 | (2006.01) |

(52) U.S. Cl.
CPC .............. *B23P 15/26* (2013.01); *B65D 90/06* (2013.01); *F25D 11/003* (2013.01); *F25D 23/064* (2013.01)

(58) Field of Classification Search
CPC ....... B23P 15/26; B65D 90/06; B65D 88/121; B65D 88/745; B65D 90/023; F25D 11/003; F25D 23/064; E04B 31/3483; C02F 1/004

See application file for complete search history.

*Primary Examiner* — Lee A Holly
(74) *Attorney, Agent, or Firm* — Frank M. Scutch, III

(57) ABSTRACT

A method for repurposing a shipping container into a refrigerated cold box includes the steps of cleaning the inside and outside of the shipping container. The inside and outside of the shipping container are then primed after removal of all rust. The interior of the shipping container is then framed into one or more compartments. Foam insulation is then sprayed within the interior of compartment(s) to a predetermined depth and walls and flooring are installed with plywood covered in stainless steel sheeting. Finally, the interior and exterior of the shipping container is painted with a ceramic paint to further increase its insulative properties.

7 Claims, 2 Drawing Sheets

METHOD FOR REPURPOSING A SHIPPING CONTAINER INTO A REFRIGERATED COLD BOX

FIELD OF THE INVENTION

The present invention relates generally to a refrigerated cold box and more particularly to a method increasing the efficiency of the cold box.

BACKGROUND

Refrigerated cold box containers are well known in the art. However, when used in situations where they are remotely powered, they often too inefficient such that power is wasted to maintain freezing temperatures. Energy generated by the sun or stored in batteries needs to be used very efficiently in view of the high duty cycle of the cold box. Hence, the cold box must be as thermally efficient as possible.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
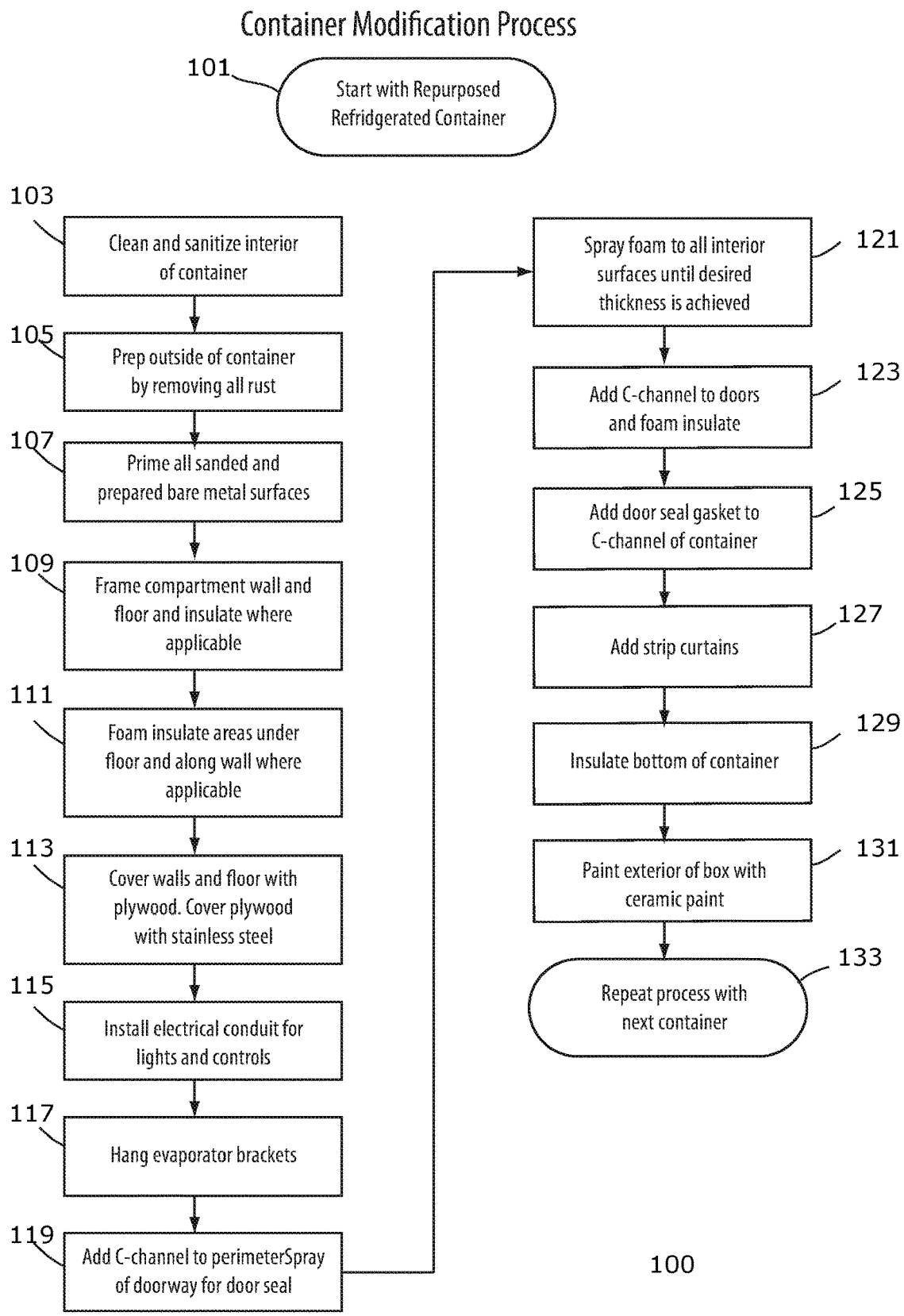
FIG. 1 is a flow chart diagram illustrating the steps used in repurposing a shipping container into a solar powered refrigerated cold box.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method for increasing the efficiency of a refrigerated cold box. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is a flow chart illustrating steps in a method repurposing a shipping container into a refrigerated cold box. The method 100 starts initially with a repurposed refrigeration container that will be powered "off grid" using solar energy and batteries or portable on-board AC generator. Initially, the interior of the repurposed cold box container is cleaned and sanitized generally using a pressure washer using a chemical additive 103. The outside of the container is also prepared by removing all rust and/or other debris 105. All bare metal surfaces are sanded and primed so as to prevent further rust or corrosion through exposure to moisture 107. Thereafter, the compartment walls can then be framed and insulated where applicable 109. Those skilled in the art will also recognize that internal framing may be accomplished using wood or metallic members. Many different internal framing configurations are possible however the interior of the cold box is generally framed into either two or three sections. Areas under the floor and along the walls are foam insulated to an insulation value of at least R-50 111. The walls and floor are next covered in plywood that has been wrapped in stainless steel sheet metal 113. Electrical conduit can then be installed for both the lights and any required control circuitry 115. Evaporator brackets for hanging refrigeration evaporators are then hung on the walls 117 at predetermined locations to accommodate their size and venting requirements.

Figure 2:
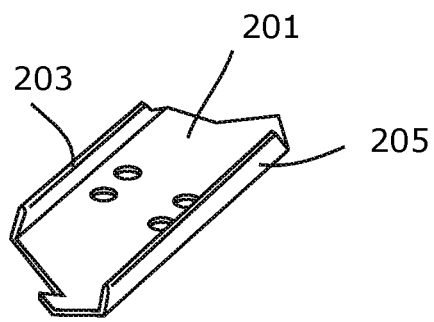
FIG. 2 illustrates a shipping container after repurposing for use as a refrigerated cold box powered using off-grid power applications.

FIG. 2 illustrates a c-channel 200 that is sometimes referred to as a structural channel. A c-channel is added to the perimeter of the doorway door seal 119. Its cross section consists of a wide "web" 201, that is typically oriented vertically and two "flanges" at the top and bottom of the web 203, 205. The flanges stick out on one side of the web so that the c-channel can lay flat on a floor or wall surface. A c-channel is distinguished from an I-beam, H-beam or W-beam type steel cross section in that those structures have flanges on both sides of the web.

Once the c-channel is installed, foam is then sprayed to all interior surfaces until a desired thickness and R value is achieved 121. A c-channel is then added to the doors and filled with foam insulation 123. A door seal gasket is added to the c-channel 125. Strip curtains are then added 127 and the interior bottom of the container is insulated 129. The exterior of the box can then be painted with ceramic paint 131 or the like and this process is repeated with the next container as necessary 133.

Figure 3:
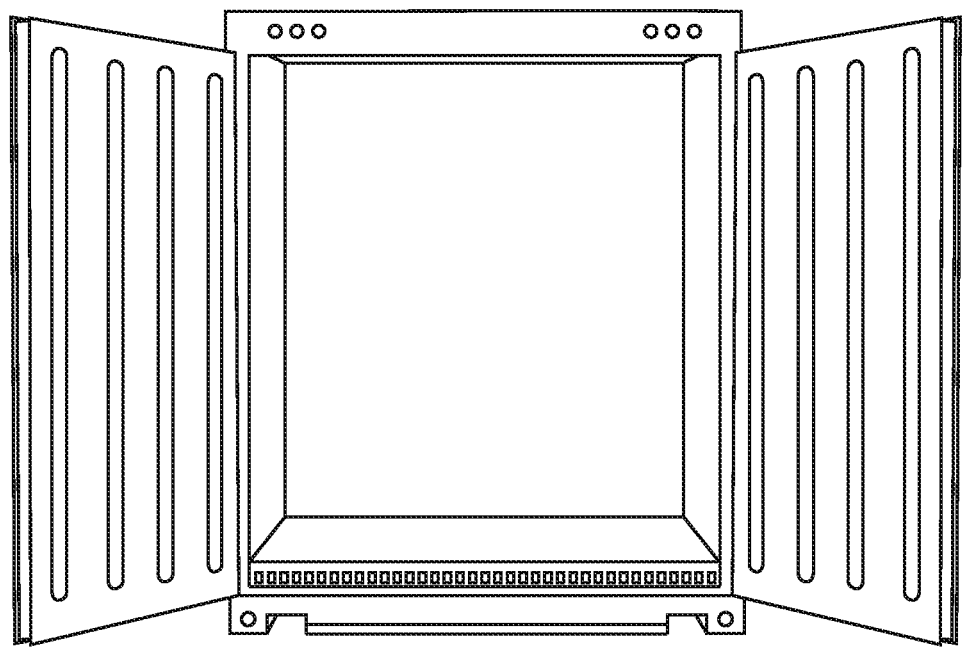
FIG. 3 is an illustration of a c-channel structural member used in accordance with embodiments of the invention.

FIG. 3 is an illustration showing a shipping container that has been repurposed into a cold box. A typical cold box may include some minimal insulation which can range from as little as ½ inch in thickness for vegetable produce haulers up to 6 inches in thickness for ice cream carriers. Many cold box containers used for local and regional food-service deliveries have approximately 2.5 inches of wall insulation. These can operate with two cold compartments and a third non-cooled compartment for dry groceries. The three compartments can be separated by movable insulated bulkheads. Food-service type trailers are usually built more stoutly than long-haul reefers since customers want strength and durability in every component of the box so it will last typically from 10 to 20 years. In the trucking industry, long-haulers want light weight to carry higher payloads, so they specify things like aluminum structural members and thinner walls. Such trailers wear out faster, but planned life cycles are correspondingly short.

Generally, the amount of insulation needed in the cold box is determined by the temperature of refrigeration required. Other important factors include the airflow which must flow around the refrigerated contents within the box. To achieve airflow, air chutes is generally recommended, especially in longer trailers or in circumstances where constant temperature is desired throughout the cold box. When repurposing the cold box for use in solar powered application, those skilled in the art will recognize that insulation must be adequate on each of the walls, ceiling, floors and doors. The heat transport constant, referred to as "Ua value", is a measure of the trailer's thermal efficiency where the higher the Ua number, the more refrigeration will be required.

Over time, insulation will degrade, crumble and absorb moisture, etc. This allows heat and cold will move more easily from outside and inside the trailer. Hence, when repurposing a cold box, it is wise to specify some additional reserve capacity allowing for this degradation. Moreover, the outer body color of the cold box can affect internal temperature such that the darker cold box surface, the more of the sun's heat will be absorbed and the more cooling capacity will be required to maintain temperature in warmer climates. Swing doors generally seal more completely than roll-up doors. Side doors can add delivery convenience, but introduce more openings through which cooled air will be lost. The cold box flooring typically will include channels that promote airflow underneath the cargo, as opposed to a flat or "diamond plate" type floor. Finally, a corrugated metal skin can be placed on the outside surface of the box.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for repurposing a shipping container into a refrigerated cold box comprising the steps of:
    cleaning an inside and outside of the shipping container;
    sanding and priming the inside and outside surfaces of the shipping container;
    framing the interior of the shipping container with at least one predetermined compartment;
    spraying foam insulation within the interior of the at least one predetermined compartment to a predetermined depth;
    installing walls and flooring with plywood covered in stainless steel sheet; and
    painting the exterior of the shipping container with ceramic paint.

2. The method for repurposing a shipping container as in claim 1, further comprising the steps of:
    installing a c-channel around at least one door of the shipping container; and
    filling the c-channel with spray insulation for improving insulation around the at least one door.

3. The method for repurposing a shipping container as in claim 1, further comprising the step of:
    wrapping the outside of the shipping container with a corrugated metal skin.

4. A method for converting a shipping container into a refrigerated cold box comprising the steps of:
    cleaning an inside and outside of the shipping container with pressurized water;
    sanding rust from inside and outside surfaces of the shipping container;
    applying priming paint to the inside surface and outside surface of the shipping container;
    constructing framing inside the shipping container to form at least one compartment;
    installing a c-channel around at least one door accessing the shipping container;
    spraying foam insulation inside the at least one compartment and the c-channel;
    installing plywood covered with stainless steel sheet to the walls and floor of the at least one compartment; and
    painting the outside of the shipping container with ceramic paint for increasing the R factor of the sprayed insulation.

5. The method for converting a shipping container as in claim 4, further comprising the step of:
    installing a corrugated metal skin on the outer surface of shipping container.

6. A method for repurposing a shipping container into a refrigerated cold box comprising the steps of:
    cleaning an inside and outside of the shipping container;
    sanding inside and outside surfaces of the shipping container to remove rust;
    priming the inside and outside of the shipping container;
    framing the interior of the shipping container into at least one predetermined compartment;
    spraying foam insulation within an interior of the at least one predetermined compartment to a predetermined R value;
    installing a c-channel around at least one door of the shipping container;
    filling the c-channel with spray insulation for improving insulation around the at least one door;
    installing walls and flooring with building materials covered in stainless steel sheeting; and
    painting any interior surfaces not covered in stainless steel sheeting; and
    painting an exterior of the shipping container with ceramic paint to provide a insulative layer to the at least one interior compartment.

7. The method for repurposing a shipping container as in claim 6, further comprising the step of:
    wrapping the outer surface of the shipping container with a corrugated metal skin.

* * * * *